Figure 1:
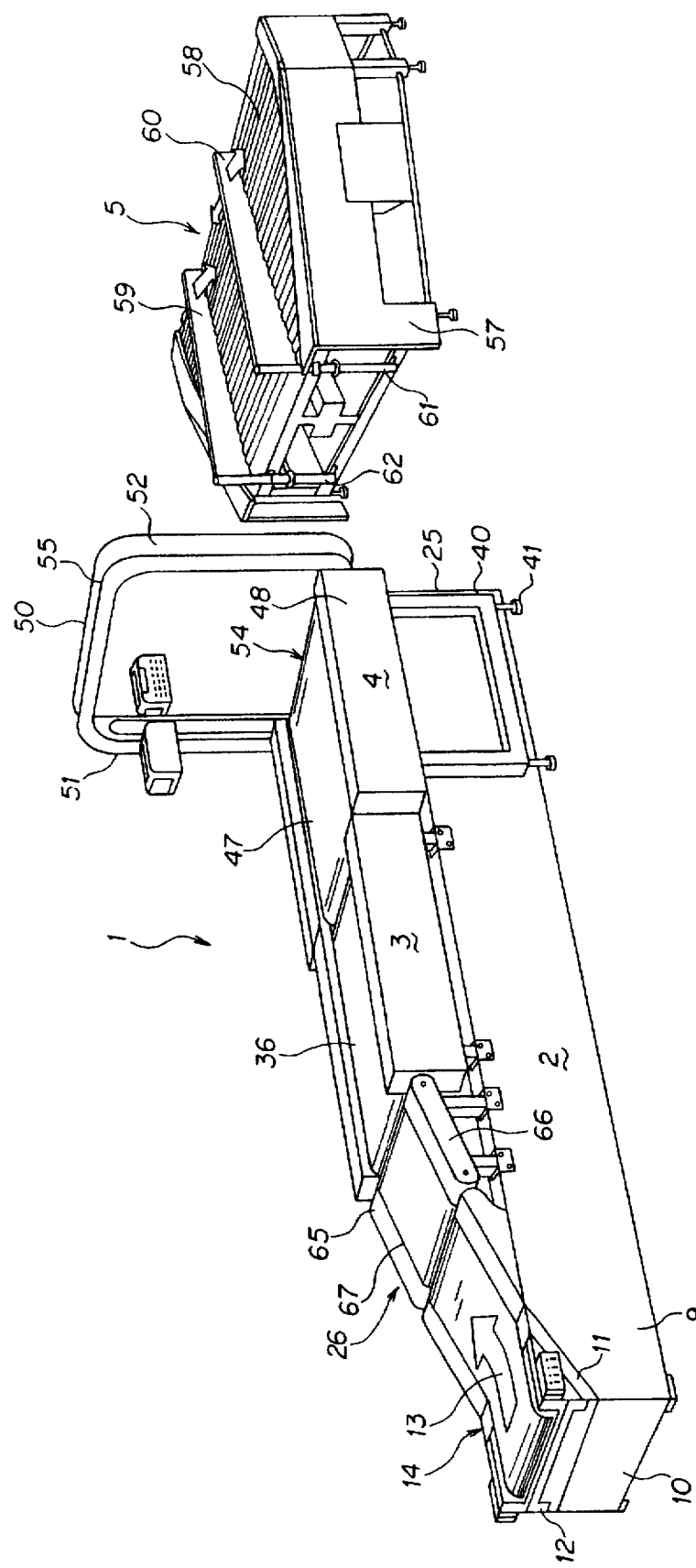

United States Patent [19]
Christmann

[11] Patent Number: 5,796,052
[45] Date of Patent: Aug. 18, 1998

[54] TELESCOPIC CONVEYOR FOR CONVEYING AND MEASURING ARTICLES

[75] Inventor: Jürgen Christmann, Hattersheim, Germany

[73] Assignee: Caljan A/S, Hasselager, Denmark

[21] Appl. No.: 492,121

[22] PCT Filed: Dec. 10, 1994

[86] PCT No.: PCT/DE94/01470

§ 371 Date: Aug. 10, 1995

§ 102(e) Date: Aug. 10, 1995

[87] PCT Pub. No.: WO95/16626

PCT Pub. Date: Jun. 22, 1995

[30] Foreign Application Priority Data

Dec. 14, 1993 [DE] Germany ............... 43 42 534.8

[51] Int. Cl.$^6$ .............. G01G 13/02; G01G 19/00; B65G 43/00; B65G 15/26
[52] U.S. Cl. .............. 177/145; 177/119; 177/121; 177/122; 177/120; 198/502.2; 198/812; 198/594
[58] Field of Search .............. 198/502.2, 369.1, 198/369.5, 461.3, 812, 436–437, 456–457; 177/119–122, 145

[56] References Cited

U.S. PATENT DOCUMENTS

| | | | |
|---|---|---|---|
| 3,127,978 | 4/1964 | Zuercher | 198/139 |
| 3,485,339 | 12/1969 | Miller et al. | 198/34 |
| 3,666,073 | 5/1972 | Lings et al. | 198/1 |
| 3,983,988 | 10/1976 | Maxted et al. | 198/365 |
| 4,419,384 | 12/1983 | Kane et al. | 427/57 |
| 4,643,299 | 2/1987 | Calundan | 198/812 |
| 5,101,958 | 4/1992 | LeMay et al. | 198/436 |
| 5,230,391 | 7/1993 | Murata et al. | 177/50 |
| 5,308,930 | 5/1994 | Tokutu et al. | 177/25.13 |

*Primary Examiner*—Michael L. Gellner
*Assistant Examiner*—Anh Mai
*Attorney, Agent, or Firm*—Frishauf, Holtz, Goodman, Langer & Chick, P.C.

[57] ABSTRACT

The conveyor (1) includes a telescoping conveyor (2) with a boxlike basic body (9), above which a separating conveyor (3) and a weighing device (4) are located, thereby saving space which would be necessary if the separating conveyor (3) and the weighing device (4) were set up separately.

13 Claims, 2 Drawing Sheets

TELESCOPIC CONVEYOR FOR CONVEYING AND MEASURING ARTICLES

The invention relates to an apparatus as generically defined by the preamble to claim 1 and to a method for conveying and measuring articles.

In the industry, conveyors for articles are known that include a telescoping conveyor, a separating conveyor, a weighing device with a volume measuring frame, and a shunt, also known as a router table. The telescoping conveyor has a basic body supported at an adjustable height in a corresponding retainer device, and two extensible telescoping segments are displaceably supported in the basic body. The basic body and the telescoping segments are provided with deflection rollers, around which a conveyor belt is guided. The conveyor belt is also guided around a drive roller, which is located in the basic body and is driven by an electric motor. The conveyor belt is driven in such a way that its upper run extends from the outer end of one telescoping segment to the basic body. The extended telescoping segment thus forms a place where articles can be deposited.

To separate the articles of bulk goods traveling on the conveyor belt and to extend the conveying path, a separating conveyor is set up on the side of the basic body opposite the telescoping segments. The separating conveyor has a basic frame in which a plurality of axially parallel rollers are rotatably supported, at least one of them being driven via an electric motor. A conveyor belt whose upper run follows on the trailing end of the telescoping conveyor essentially without any offset is wrapped tightly about the rollers. The conveyor belt of the separating conveyor runs at a markedly higher speed than the conveyor belt of the telescoping conveyor; thus the articles are taken on separately, or in other words individually. A weighing device that also has a driven conveyor belt guided over rollers is set up following the separating conveyor. The rollers that guide the conveyor belt are supported, along with the associated drive mechanism, on an auxiliary frame that is seated, via a weighing cell, on a supporting frame. Further measuring devices are located in the weighing device, one of them being the aforementioned volume measuring frame. This frame, through which the articles must pass, has a number of photoelectric barriers, for both the vertical and the horizontal direction. They form an electronic curtain for determining the volume of the articles passed through the volume measuring frame. There is also a scanner, which reads the bar code on the articles and sends them to a control unit.

The shunt for the articles is set up immediately following the weighing device. It has an approximately trapezoidal roller table, mounted on a corresponding frame, whose conveying plane, defined by the rollers, is located at the same height as the upper run of the weighing device. On the output side, the shunt for the articles is connected for a plurality of further conveyors, which take on the articles from the shunt. To switch the conveying path from the weighing device to one of the conveyor devices leading away from the shunt, the shunt has two guide baffles that are pivotable about vertical axes spaced apart from and parallel to one another. For pivoting these guide baffles, a drive mechanism is provided, which is controlled by the aforementioned processing unit.

The conveyor described thus far requires considerable floor space to be set up on. The basic body of the telescoping conveyor alone has a length of about five meters. Added to this are the lengths of the separating conveyor and the weighing device, which together make up more than three meters, and the space needed for the shunt for the articles. The required space of over eight meters in length is generally unavailable, especially in the kinds of goods handling tasks where the system described is used.

With this as its point of departure, it is an object of the invention to create a conveyor for articles that occupies markedly less space, and in which the articles conveyed are automatically weighed and if need be also measured. It is also an object of the invention to create a method for conveying and measuring articles that assures that the space required by a system that performs the method will remain small.

The aforementioned object is attained by a conveyor for articles as defined by the characteristics of the body of claim 1. In the conveyor of the invention, the separating conveyor is located above the telescoping conveyor. An upper run portion of the conveyor belt that belongs to the telescoping conveyor passes beneath the separating conveyor. To enable a transfer of the articles from the conveyor belt belonging to the telescoping conveyor to the conveyor belt belonging to the separating conveyor, one portion of the conveyor belt is raised in height relative to the conveyor belt that runs along beneath the conveyor. The articles brought by the conveyor belt of the telescoping conveyor thus run smoothly over onto the higher-speed separating belt. Since the separating conveyor is seated above the basic housing of the telescoping conveyor, however, no additional space whatever is needed in the conveying direction of the conveyor for the separating conveyor. The same is true for the weighing device. It too is located above the basic housing of the telescoping conveyor, so that no additional space whatever is needed for it longitudinally of the conveyor. The weighing device with its conveyor belt follows immediately on the conveyor belt of the separating conveyor, so that both conveyor belts are located with their upper runs in essentially the same plane. The arriving articles are already transferred in this plane on the telescoping end of the basic body, and travel in this plane through the separating conveyor and the weighing device above the telescoping conveyor. The space occupied by the telescoping conveyor is thus utilized in a dual way: First, by the basic housing of the telescoping conveyor, which must have a certain minimum length in order to receive the telescoping segments. Second, the separating conveyor and the weighing device are located over the same longitudinal portion; thus the total structural length of the conveyor is shortened considerably. The space formerly required for the separating conveyor and the weighing device in the length of the conveyor is entirely unneeded. This allows vastly greater freedom in the design and setup of the conveyor.

The housing of the separating conveyor can be connected firmly to the basic housing of the telescoping conveyor. This is possible because the housing of the separating conveyor is mounted on the basic housing of the telescoping conveyor and screwed to it. Moreover, it is possible to weld the two stands to one another or to integrate them into a single structural unit. In an individual case, however, it may be appropriate to set the separating conveyor up on the floor on its own legs which extend past the basic housing of the telescoping conveyor.

The height difference between the telescoping end of the telescoping conveyor and the height of the upper run of the separating conveyor can be overcome in a simple way with a ramp, also called a belt hump, over which the conveyor belt is guided. On this ramp, the articles are raised from the conveyor belt to the height of the separating conveyor.

To assure good weighing accuracy, it may be advantageous to decouple the telescoping conveyor and the separating conveyor vibrationally from the weighing device. The effect of the decoupling is that bumping and jarring, which can occur when articles are thrown onto the telescoping conveyor, do not reach the weighing device. This assures good accuracy of measurement of the masses traveling via the weighing device.

The vibrational decoupling of the weighing device from the remainder of the system can be attained in a simple way by setting up the basic stand of the weighing device on the floor separately. The basic stand of the weighing device then spans the basic housing of the telescoping conveyor. The telescoping conveyor and the weighing device do not touch one another.

The weighing device may be provided with linings laterally of both sides of the conveyor belt. To prevent objects placed on the linings from falsifying the outcome of measurement of the articles passing through, or falsification of the measurement outcome if workers in the region of the conveyor brace themselves against the linings, it is advantageous if the linings are suspended from or braced against the basic stand.

The conveyor belt belonging to the telescoping conveyor may be guided on the ramp via deflection rollers from the height of the upper run of the separating conveyor to below the housing of the separating conveyor. From there, the conveyor belt extends onward as far as the end of the basic housing opposite the telescoping segments. Thus the telescoping segments can as needed be thrust into the basic housing of the telescoping conveyor, without being impeded by the upper run of the conveyor belt. This is the case especially whenever the portion of the conveyor belt that is guided beneath the separating conveyor and the weighing device is located essentially parallel to the upper runs of the separating conveyor and of the weighing device.

In the weighing device, a volume measuring frame may be provided, for determining the three-dimensional content of the articles conveyed through the volume measuring frame. The volume measuring frame is a rectangular frame whose inside diameter and height assure that even the largest articles to be conveyed can pass through it. A number of photoelectric barriers are provided on the frame, forming an electronic curtain. The photoelectric barriers detect both the width and the height of the articles passing through the frame. To determine the length of the articles to be measured, a speed signal is used, which may be derived from a speed measuring device. From the duration of the passage of an article through the volume measuring frame and from the conveying speed, a conclusion about the length of the article can be drawn.

To detect code markings, such as bar code labels or the like, that are applied to the articles, a scanner may be provided on the conveyor. The scanner may be provided on both the separating conveyor and on the weighing device. However, it is also possible for this scanner to be integrated with the volume measuring frame.

For further conveying of the separated, weighed articles, a further conveyor device can follow on the weighing device. If sorting of the articles being conveyed is to be undertaken already at this point, on the basis of the data obtained from the scanner or the weighing device or in some other way, then the further conveyor device may be a shunt for the articles, also known as a router table, which has one inlet and at least two outlets. This shunt may simply be an approximately trapezoidal roller table, whose short side faces the weighing device. The broad side is then followed by further conveyor devices. To select a conveying path that leads from the short side of the trapezoidal roller table to one of the further conveyor devices connected to it, two guide baffles may be provided on the roller table, which are pivotable about two vertical axes extending parallel to and spaced apart from one another. The control of these guide baffles may be done manually or under the control of the scanner.

If the telescoping conveyor is adjustable in height, then the conveyor for articles can be adapted to various given conditions. The height adjustability can be achieved simply by supporting the basic housing of the telescoping conveyor, for instance on its end opposite the telescoping segments, pivotably about a crosswise axis in a pedestal, and by supporting it, on the side where the telescoping segments are located, via adjustable-length means in the pedestal. The adjustable-length means may be screw spindles, hydraulic cylinders, or the like.

The part of the object of the invention that is directed to the method for conveying and measuring articles is attained by a method having the characteristics of claim 23.

Since in this method the articles are already separated in one region—that is, they are formed into a row of articles that move in a row spaced apart from one another, and this row of articles is weighed—the space formerly required for setting up a separating conveyor and a weighing device is now no longer necessary.

Accordingly, the method makes possible an especially compact design of the conveyor. A double use is made of the space. The space occupied by the basic housing of the telescoping conveyor is intrinsically virtually irreducible, because the size of the basic housing is dictated by its function, namely of having to hold the telescoping segments. The size of both the separating conveyor and the weighing device is virtually irreducible as well. Considerable space is saved, however, by stacking these components one above the other, while preserving an elongated conveying path.

It is moreover advantageous if the articles are measured in accordance with their volume, and if any codes that may be present are scanned. The articles can be sorted in accordance with the information thus obtained, for instance by positioning a shunt which follows the conveyor accordingly.

Figure 2:
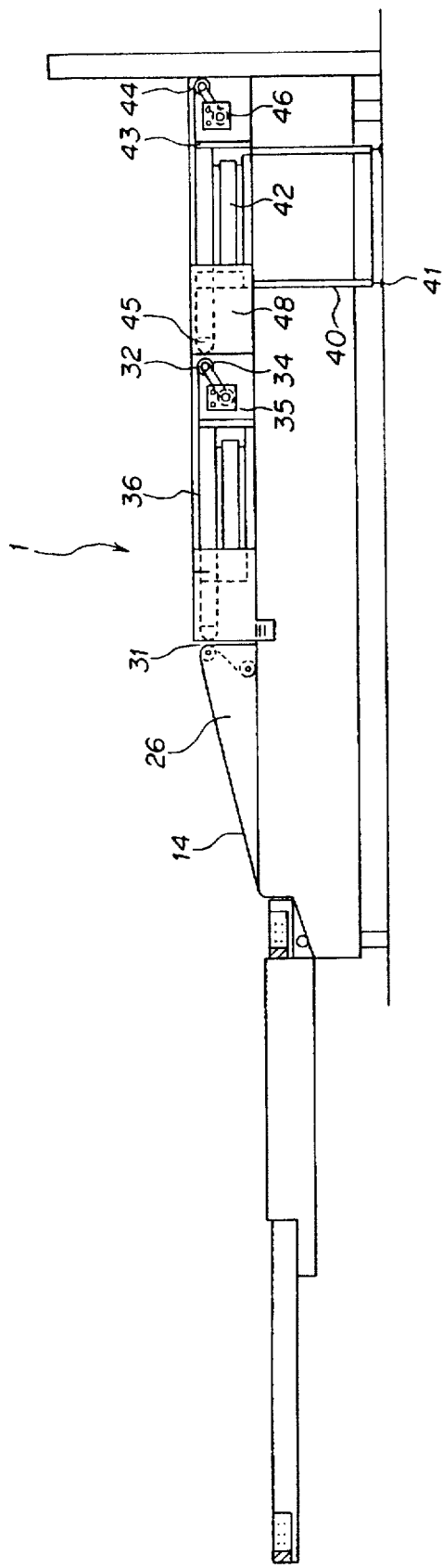
Figure 3:
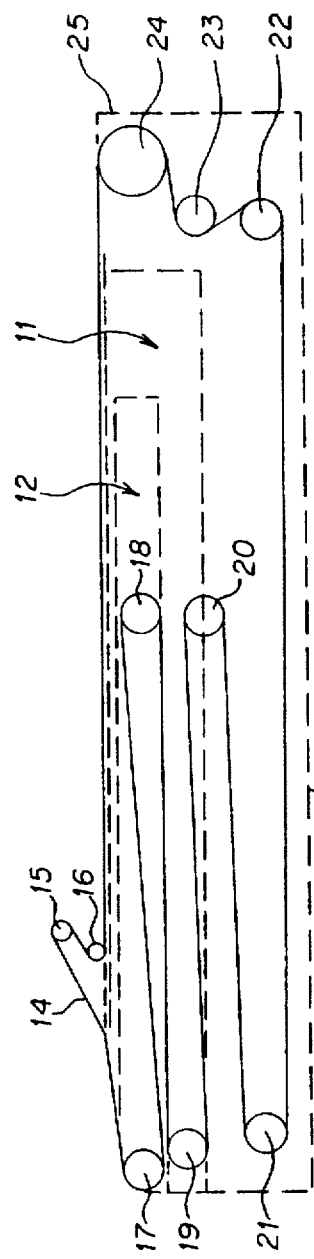

An exemplary embodiment of the invention is shown in the drawing. Shown are:

FIG. 1, a perspective view of a conveyor according to the invention;

FIG. 2, a side view of the conveyor of FIG. 1, with the telescoping segments telescopingly extended; and FIG. 3, a sectional view of a detail of the telescoping conveyor of FIGS. 1 and 2.

In FIG. 1, a conveyor 1 is shown that includes a telescoping conveyor 2, a separating conveyor 3 and a weighing and measuring device 4. The conveyor 1 is followed directly by a shunt 5 for articles, which in operation is set up following the weighing and measuring device 4 without any significant space between them.

The telescoping conveyor 2 has an elongated, approximately boxlike basic housing 9, which is set up with suitable feed on the floor available at the setup location. On one face end 10, the substantially boxlike basic housing 9 has two extensible telescoping segments 11, 12. The telescoping segments 11, 12 are adjustable in the conveying direction, which is represented by an arrow 13. While the telescoping segments 11, 12 in the conveyor 1 shown in FIG. 1 are shown in their retracted position, in the conveyor 1 shown in FIG. 2 they have been extended. The telescoping conveyor 2 has a conveyor belt 14 for conveying articles that wraps around deflection rollers 15–23, provided on both the basic housing 9 and on the telescoping segments 11, 12, and a drive roller 24. The deflection rollers 15–23 and the drive roller are rotatably supported with parallel axes of rotation in the basic housing 19 and in the telescoping segments 11, 12; the arrangement and function of the deflection rollers 18–21, which enable the free extensibility of the telescoping segments 11, 12, will be referred to later herein, in conjunction with FIG. 3. The drive roller 24, located on a side 25 of the basic housing 9 facing away from the telescoping segments 11, 12 is disposed above the deflection rollers 22, 23, which serve to develop and adjust a desired tension of the conveyor belt. The drive roller 24 is connected to an electric motor, via suitable transmission means not shown further, and drives the conveyor belt 14.

Following the telescoping segments 11, 12 on the basic housing 9, a ramp 26 is provided, which raises the conveyor belt 14. As shown particularly in FIG. 2, the conveyor belt 14 then runs from the deflection roller 17 located on the outermost end of the telescoping segment 12 in a single plane along the top of both telescoping segments 11, 12. At the ramp 26, the conveyor belt 14 is guided upward, until it has reached the level of the separating conveyor 3. From there, it is returned by the deflection rollers 15, 16 back to the plane in which it has already run in the telescoping segments 11, 12, and in which it extends below the separating conveyor 3 and the weighing and measuring device 4 as far as the drive roller 24.

The separating conveyor 3 has a substantially boxlike housing 30, screwed onto the basic housing 9 and whose width matches the width of the basic housing 9. In the housing 30, on the side 31 adjacent to the ramp 26, there is a rotatably supported deflection roller 32, whose axis of rotation is essentially parallel to the other deflection rollers 15–23. On a side 33 of the housing 30 opposite the side 31, a drive roller 34 is rotatably supported parallel to the deflection roller 32; this drive roller 34 is driven by an electric motor 35 via a transmission means, such as a toothed belt. An endless conveyor belt 36 is guided around the deflection roller 32 and the drive roller 34, with its upper run extending substantially horizontally and being located out in the open. The upper run of the conveyor belt 36 follows the conveyor belt 14, which has been raised by the ramp 26 and the deflection roller 15, essentially smoothly or in other words without any major offset.

Because the electric motors and transmission means that drive the drive rollers 24 and 34 are dimensioned appropriately, the conveyor belt 36 runs markedly faster in the conveying direction represented by the arrow 13 than the conveyor belt 14.

Following the side 32 of the separating conveyor 3, the measuring and weighing device 4 is set up on a separate basic frame 40. The basic frame 40 is not in contact with the basic housing 9, and hence a direct transmission of vibration from the basic housing 9 to the basic frame 40 is averted. The basic frame 40 is set up directly on the floor of the particular setup location, via adjustable screw-type leveling feet 41. A weighing cell 42 is located on the basic frame 40 spanning the basic housing 9, and it carries an auxiliary frame 43 on its top. A drive roller 44 and a deflection roller 45 with axes parallel to one another are rotatably supported in the auxiliary frame 43. The drive roller 44 is provided on the end of the auxiliary frame 43 toward the separating conveyor 3. The drive roller 44 that is driven by a geared motor 46 via a toothed belt is located on the opposite end of the auxiliary frame 43. An endless conveyor belt 47 runs over the deflection roller 45 and the drive roller 44 at essentially the same speed as the conveyor belt 36 of the separating conveyor 3. The conveyor belt 47 is located with its upper run at the same level as the upper run of the conveyor belt 36, so that the articles traveling on the conveyor 1 are transferred essentially smoothly by the separating conveyor 3 onto the conveyor belt 47 of the measuring and weighing device 4.

In the measuring and weighing device 4, the entire auxiliary frame 43, with all the parts provided on it, namely the drive roller 44, the deflection roller 45, the geared motor 46 and the conveyor belt 47, rests as a background load on the weighing cell 42. To prevent this background load from being changed, for instance by objects that can be placed on laterally arranged lining parts 48, these lining parts 48 are secured to the basic frame 40 with suitable retainers.

The measuring and weighing device 4 follows the side 25 of the basic housing 9 essentially smoothly.

For further measuring and detecting of articles to be conveyed, the measuring and weighing device 4 is followed by a volume measuring frame 50. The volume measuring frame 50 is an essentially rectangular frame, whose spaced-apart legs 51, 52 extending parallel to one another are arranged vertically and on both sides of the conveying path, and whose horizontal, spaced-apart legs 53, 54 are located above or below the conveying path. As shown in FIG. 2, the volume measuring frame 50 stands separately on the floor, adjoining the basic housing 9. However, it may also be connected to the basic frame 40 of the measuring and weighing device 4 by way of a suitable retainer, so that the measuring and weighing device 4 and the volume measuring frame 50 form a structural unit.

Light sources and photoelectric sensors, some of which form horizontal photoelectric barriers and others of which form vertically acting photoelectric barriers, are provided in the legs 51–54. These photoelectric barriers form an electronic curtain, deployed in the volume measuring frame 50, which simultaneously records not only the passage through it of an article but its height and width as well. To detect the volume of the article passing through the volume measuring frame 50, a speed signal is needed; this can be obtained in a simple way by ascertaining the travel speed of the conveyor belt 47. This signal can be obtained for instance by detecting the rpm of the drive roller 44 or the rpm of the deflection roller 45.

A scanner, not shown in further detail, is also provided on the conveyor 1 and can read off corresponding code bars applied to the articles. This scanner is located in the region of the separating conveyor 3 or the measuring and weighing device 4.

The shunt 5 for the articles, which follows the measuring and weighing device 4 directly at the side 25 of the telescoping conveyor 2, has a trapezoidal table 57, on top of which rollers 58 that are located at the same height as the upper run of the conveyor belt 47 are rotatably supported. The width of the table 57 is equivalent to the width of the measuring and weighing device 4, so that the articles resting on the conveyor belt 47 shift smoothly onto the rollers 58 of the table 57. Of the rollers 58, at least some are driven, so that the articles are correspondingly conveyed onward. The table 57 widens enough in the conveying direction that a plurality of further conveyor devices can be set up on its outlet end. To determine which of these conveyor devices the articles to be conveyed should be sent to, guide baffles 59, 60 are located above the rollers 58 of the table 57 and are pivotably supported on vertical shafts 61, 62 spaced apart from and parallel to one another. The shafts 61, 62 are connected to a drive mechanism, which is controlled by a control unit not otherwise shown. The control unit controls the guide baffles 59, 60 as needed, either manually or on the basis of the data obtained from the scanner or the measuring and weighing device 4 in conjunction with the volume measuring frame 50.

In FIG. 3, the guidance of the conveyor belt 14 and the arrangement of the deflection rollers 15–23 and of the drive roller 24 are shown separately in schematic fashion. The deflection roller 17 is rotatably supported on the outer end of the telescoping segment 12. The deflection roller 18 is located in the telescoping segment 12 at a distance from the deflection roller 17 that is at least as great as the maximum extension distance of the telescoping segment 12. In the same way, the telescoping segment 11 has the deflection roller 19 on its outer end. The deflection roller 19 is at a distance from the deflection roller 18 that is greater than the maximum extension distance of the telescoping segment 12. The deflection roller 20 is provided on the telescoping segment 11 at a greater distance from the deflection roller 19, and the distance between this deflection roller 20 and the deflection roller 21, supported in the basic housing 9 on the side 10, is greater than the maximum extension distance of the telescoping segment 11. If the telescoping segment 12 is now extended, then the portion of the conveyor belt 14 located between the deflection rollers 17 and 19 increases in length, while the portion of the conveyor belt 14 located between the deflection rollers 19 and 18 decreases in length by the same amount. The total length of the intrinsically self-contained or in other words endless conveyor belt 14 thus remains constant, so that the telescoping segment 12 can be extended freely. The same is true correspondingly for the telescoping segment 11.

The conveyor described thus far functions as follows:

For unloading a container that contains articles of bulk goods, the telescoping segments 11, 12 are first moved to the applicable container. With the conveyor belts 14, 36, 47 running, the articles are then fed successively onto the conveyor belt 14. The conveyor belt 14 conveys the articles as far as the separating conveyor 3, whose faster-running conveyor belt 14 takes on the articles brought by the conveyor belt 14 and separates them by its higher travel speed. The articles making up the bulk goods thus arrive individually on the conveyor belt 47, which runs at the same speed as the conveyor 3, of the measuring and weighing device 4. The measuring and weighing device determines the mass of the article resting on the running conveyor belt 47. From the conveyor belt 47, the articles are conveyed to the shunt 5, where they are suitably directed onward. At the transition of the article from the conveyor belt 47 of the measuring and weighing device 4 to the rollers 58 of the shunt 5, the articles pass through the volume measuring frame 50, which detects the height and width of the applicable article. In conjunction with the speed signal derived from the travel speed of the conveyor belt 47, the volume of the conveyed articles is then also determined.

If a scanner is provided in the region of the separating conveyor 3 or the measuring and weighing device 4 for reading off codes applied to the bulk goods, then as the corresponding articles pass through, the scanner sends a signal to the control unit, not otherwise shown, which controls the shunt 5 for the articles.

In a modified embodiment of the telescoping conveyor 2, the ramp 26 is subdivided. In that case, the conveyor belt 14 is raised only slightly, and the further height difference from the separating conveyor 36 is overcome by an intermediate conveyor 65. This conveyor has its own frame 66, which is set up on the basic housing 9. Two rollers are located parallel to one another, rotatably supported, in this frame 66, and a short endless conveyor belt 67 is guided around them. This conveyor belt 67 has the same width as the conveyor belt 14 and runs at the same speed.

In another embodiment, the shunt 5 for the articles is connected to the telescoping conveyor 2. The table 57 can be either screwed to the basic housing 9 or integrated with it to make a structural unit.

I claim:

1. Apparatus for conveying and measuring articles, comprising:
   a telescoping conveyor having
      a basic housing,
         at least one telescoping segment that is adjustable relative to said basic housing in a conveying direction, and
         a first conveyor belt to convey articles with its upper run, said first conveyor belt being guided about at least one drive roller rotatably supported in said basic housing and about at least one deflection roller rotatably supported on said telescoping segment; and
   a weighing device including a frame, a second conveyor belt, a drive roller and a deflection roller rotatably supported in said frame and about which said second conveyor belt is guided, and a weighing cell mounted on said frame under said second conveyor belt for weighing articles being transported on an upper run of said second conveyor belt;
   wherein said weighing cell and said second conveyor belt are positioned over a portion of said telescoping conveyor; and
   wherein said upper run of said first conveyor belt is lower than said upper run of said second conveyor belt, and further comprising a ramp between said first and second conveyor belts, with articles on said upper run of said first conveyor belt being guided up along said ramp.

2. The apparatus of claim 1, wherein said weighing cell and said second conveyor belt are positioned over the basic housing of said telescoping conveyor.

3. The apparatus of claim 1, further comprising a separating conveyor including a housing, a third conveyor belt, a driver roller and a deflection roller rotatably supported in said housing and about which is guided said third conveyor belt with an upper run for conveying articles, said separating conveyor being positioned over said telescoping conveyor and between said ramp and said weighing device, wherein said second and third conveyor belts are at the same height.

4. The apparatus of claim 1, wherein the frame of said weighing device comprises a basic frame and an auxiliary frame, said basic frame spanning said telescoping conveyor transversely and resting on a floor, and said auxiliary frame being supported by said basic frame, said weighing cell and said second conveyor belt being mounted on said auxiliary frame.

5. The apparatus of claim 4, wherein said weighing device is completely separated from said telescoping conveyor so as to be vibrationally decoupled therefrom.

6. The apparatus of claim 1, wherein said weighing device is completely separated from said telescoping conveyor so as to be vibrationally decoupled therefrom.

7. The apparatus of claim 6, further comprising a separating conveyor including a housing, a third conveyor belt, a driver roller and a deflection roller rotatably supported in said housing and about which is guided said third conveyor belt with an upper run for conveying articles, said separating conveyor being positioned over said telescoping conveyor and before said weighing device in said conveying direction.

8. The apparatus of claim 7, wherein said separating conveyor is attached to said telescoping conveyor.

9. The apparatus of claim 1, further comprising a separating conveyor including a housing, a third conveyor belt, a driver roller and a deflection roller rotatably supported in said housing and about which is guided said third conveyor belt with an upper run for conveying articles, said separating conveyor being positioned over said telescoping conveyor and before said weighing device in said conveying direction.

10. The apparatus of claim 1, further comprising a conveyor device having one inlet and at least two outlets, with movable guide baffles for controlling to which of said at least two outlets articles conveyed to said one inlet will be directed, wherein said conveyor device is adjacent both said basic housing and said weighing device to receive at said one inlet articles transported thereto by said second conveyor belt.

11. A method for conveying and measuring articles, comprising the steps of:

conveying articles on conveyor belts along a conveying path which extends at least partly above a telescoping conveyor;

weighing the articles at a position located over said telescoping conveyor; and raising the articles being conveyed along the telescoping conveyor with a ramp which guides the articles up to said weighing position.

12. The method of claim 11, further comprising the step of vibrationally decoupling the articles from said telescoping conveyor during said weighing step.

13. The method of claim 11, further comprising the step of separating the articles prior to said weighing step so that each of the articles is weighed individually.

* * * * *